(12) United States Patent
Conrad

(10) Patent No.: US 11,681,106 B2
(45) Date of Patent: Jun. 20, 2023

(54) TWO-PIECE SPRING PUSH WITH STRESS DISTRIBUTION FEATURES

(71) Applicant: US Conec, Ltd, Hickory, NC (US)

(72) Inventor: Craig M. Conrad, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/517,397

(22) Filed: Nov. 2, 2021

(65) Prior Publication Data
US 2022/0137306 A1 May 5, 2022

Related U.S. Application Data

(60) Provisional application No. 63/109,152, filed on Nov. 3, 2020.

(51) Int. Cl.
*G02B 6/38* (2006.01)

(52) U.S. Cl.
CPC ......... *G02B 6/3831* (2013.01); *G02B 6/3821* (2013.01); *G02B 6/3869* (2013.01)

(58) Field of Classification Search
CPC ... G02B 6/3821; G02B 6/3831; G02B 6/3869
See application file for complete search history.

(56) References Cited

U.S. PATENT DOCUMENTS

| 8,684,611 B2 * | 4/2014 | Childers | G02B 6/3821 385/78 |
| 9,810,851 B2 * | 11/2017 | Lu | G02B 6/3821 |

* cited by examiner

*Primary Examiner* — Michael P Mooney
(74) *Attorney, Agent, or Firm* — Michael L. Leetzow PLLC; Shubhrangshu Sengupta

(57) ABSTRACT

A two-piece spring push includes a main body portion and a cap. The cap is attached to the main body portion through a locking member that is disposed within a slot in the main body. The main body also includes alignment features that are received by the cap. The cap may have a bump that extends into an opening of the main body to limit the movement of optical fibers inserted therein. A front face of the cap engages a portion of a housing of a fiber optic connector when assembled.

17 Claims, 17 Drawing Sheets

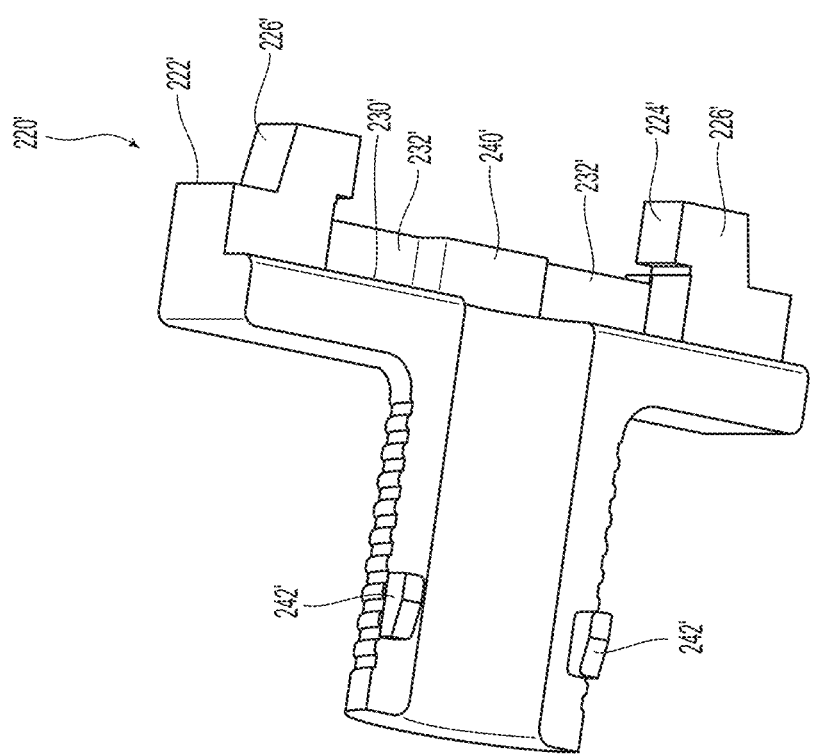

TWO-PIECE SPRING PUSH WITH STRESS DISTRIBUTION FEATURES

REFERENCE TO RELATED CASE

This application claims priority under 35 U.S.C. § 119 (e) to U.S. provisional application No. 63/109,152 filed on Nov. 3, 2020, the contents of which are hereby incorporated by reference in their entirety.

BACKGROUND OF THE INVENTION

Conventional MPO connectors have a two-piece spring push that includes a base piece or main body and a cap. See FIGS. 1A and 1B. Optical fibers are placed in a channel in the main body. A pair of posts in the front of the cap are slipped into horizontal receivers in the main body and the cap is rotated downward with the downward facing posts on the cap entering the upward facing receivers in the main body. Due to the tolerance of the posts relative to the receivers, this results in a marginal snap fit, which holds but could easily be pried apart, as shown in FIG. 2. When connectorization is completed, the cap and the main body piece are covered by a crimp band as shown in FIG. 3A. Typically, when proof load testing for this conventional MPO connector is conducted per Telcordia GR-1435 standard testing, there is a bending moment on the posts due to the 33 N proof load. This force pulls the posts from their receivers. The load then transfers to the crimp body portion of the main body, and since the stress is greater than the yield, causing the crimp body to be torn off. See FIG. 3B.

Accordingly, there could be scenarios where an MPO connector with a conventional two-piece spring push in which the connector may malfunction, and/or may fail proof load testing. Thus, a more robust two-piece spring push has been designed that manages the stress on the two-piece spring push.

SUMMARY OF THE INVENTION

According to one aspect, the present invention is directed to a two-piece spring push for use with a fiber optic connector that includes a main body, the main body having a front end, a back end, and a middle portion disposed therebetween, the front end comprising two generally parallel extensions extending from the middle portion and having an opening therebetween, the back end forming at least a portion of a cylinder and a cap configured to mate with the main body, the cap having a front face and a locking member, the locking member disposed forward of the front face and forming a gap between the locking member and the cap, the locking member engaging at least a portion of the middle portion of the main body, the cap and the main body forming an opening through at least a portion of the spring push.

In some embodiments, the locking member is attached to a forward facing surface of the front face, the main body has at least two alignment features to align the cap with the main body.

In some embodiments, the forward facing surface of the front face is a first forward facing surface and the cap has a second forward facing surface defining at least a portion of the gap.

In some embodiments, the locking member only extends across a portion of the front face of the cap.

In some embodiments, the at least two alignment features include two posts, the two posts being disposed in the gap between the second forward facing surface and the locking member when the cap and the main body are mated to one another.

In some embodiments, at least a portion of the locking member is disposed within an opening in a housing of a fiber optic connector when the fiber optic connector is fully assembled.

In yet another aspect, there is a fiber optic connector that includes a connector housing having a back end, a front end, and an opening extending therebetween, a ferrule disposed within the opening at the front end and configured to support at least two optical fibers of the fiber optic connector, and a spring push, the spring push disposed within a portion of the opening at the back end of the connector housing and engaging a spring positioned between the ferrule and the spring push, the spring push having a main body and a cap in a mated position, wherein at least a portion of the cap is within the opening of the connector housing in the mated position.

In some embodiments, the main body has a front end, a back end, and a middle portion disposed therebetween, and the cap has a front face and a locking member, the locking member disposed forward of the front face and forming a gap between the locking member and the cap to engage at least a portion of the middle portion of the main body.

In yet another aspect, there is a spring push for use with a fiber optic connector that includes a main body, the main body having a front end, a back end, and a middle portion disposed therebetween, the front end comprising two generally parallel extensions extending from the middle portion and having an opening therebetween, the back end forming at least a portion of a cylinder, and a cap configured to mate with the main body, the cap having a front face and a locking member, the locking member disposed forward of the front face, the locking member engaging at least a portion of the middle portion of the main body, wherein the cap and the main body form an opening through at least a portion of the spring push.

In some embodiments, the locking member is a forward-most component of the cap.

In some embodiments, the locking member further comprises a bridge portion joining two separate extensions and forming a gap between the cap and the locking member.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 15 is perspective view of another embodiment of a cap of a two-piece spring push according to the present invention.

DETAILED DESCRIPTION OF THE INVENTION

Figure 1A:
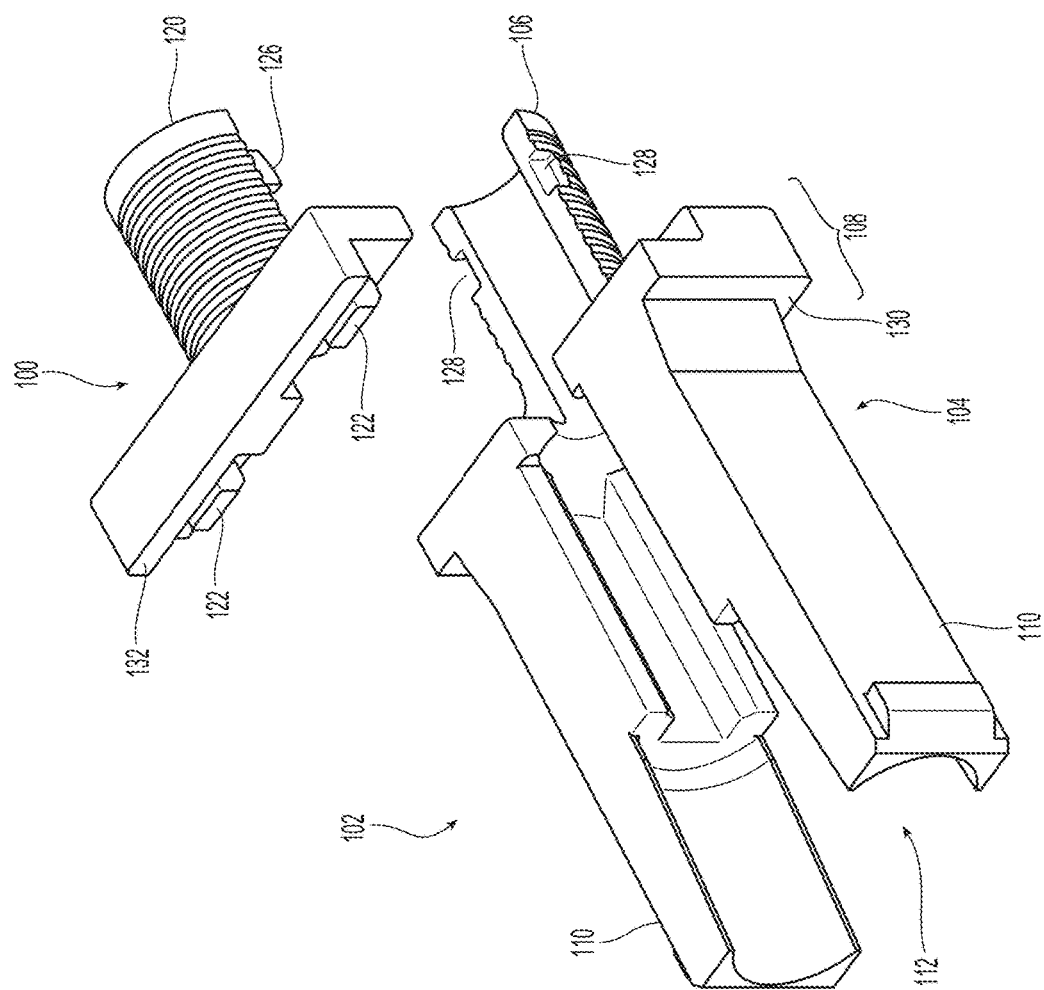
FIG. 1A is a front left perspective view of a prior art two-piece spring push in an exploded configuration.

Reference will now be made in detail to the present preferred embodiment(s) of the invention, examples of which are illustrated in the accompanying drawings. Whenever possible, the same reference numerals will be used throughout the drawings to refer to the same or like parts.

Figure 1B:
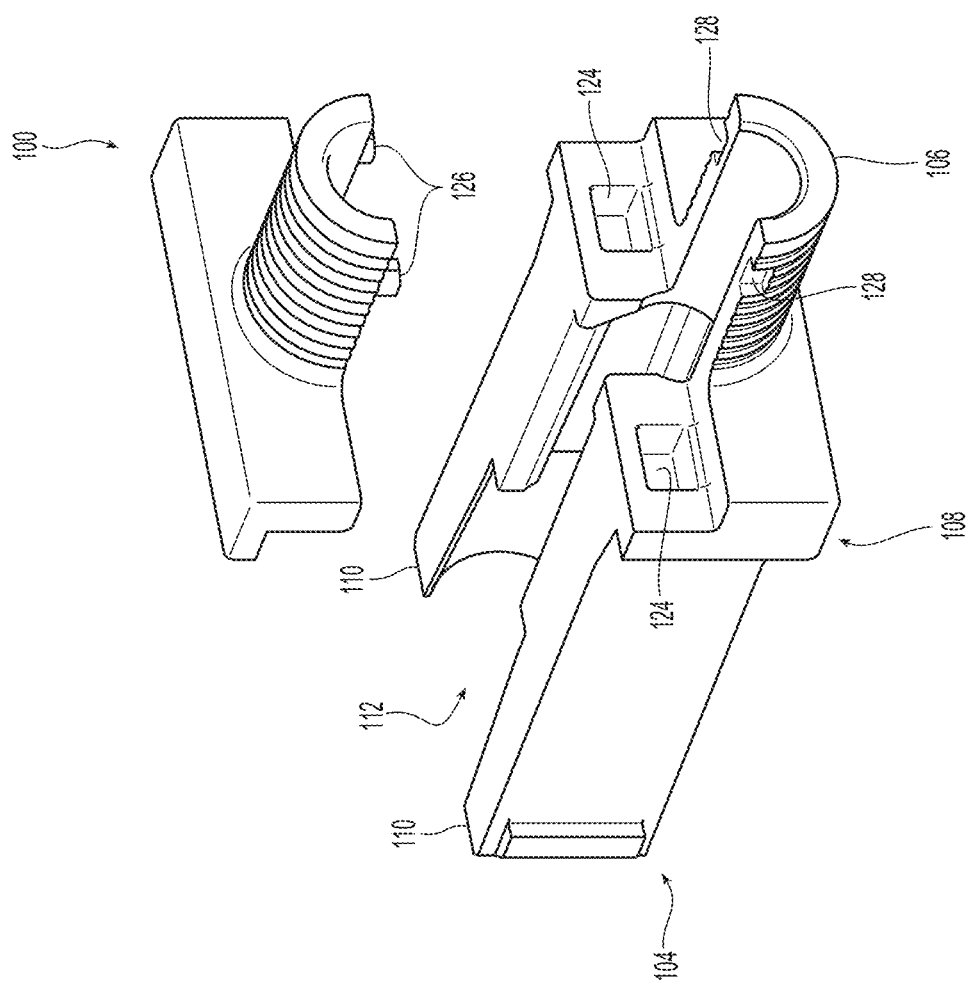
FIG. 1B is a rear left perspective view of the prior art two-piece spring push in FIG. 1A.
Figure 2:
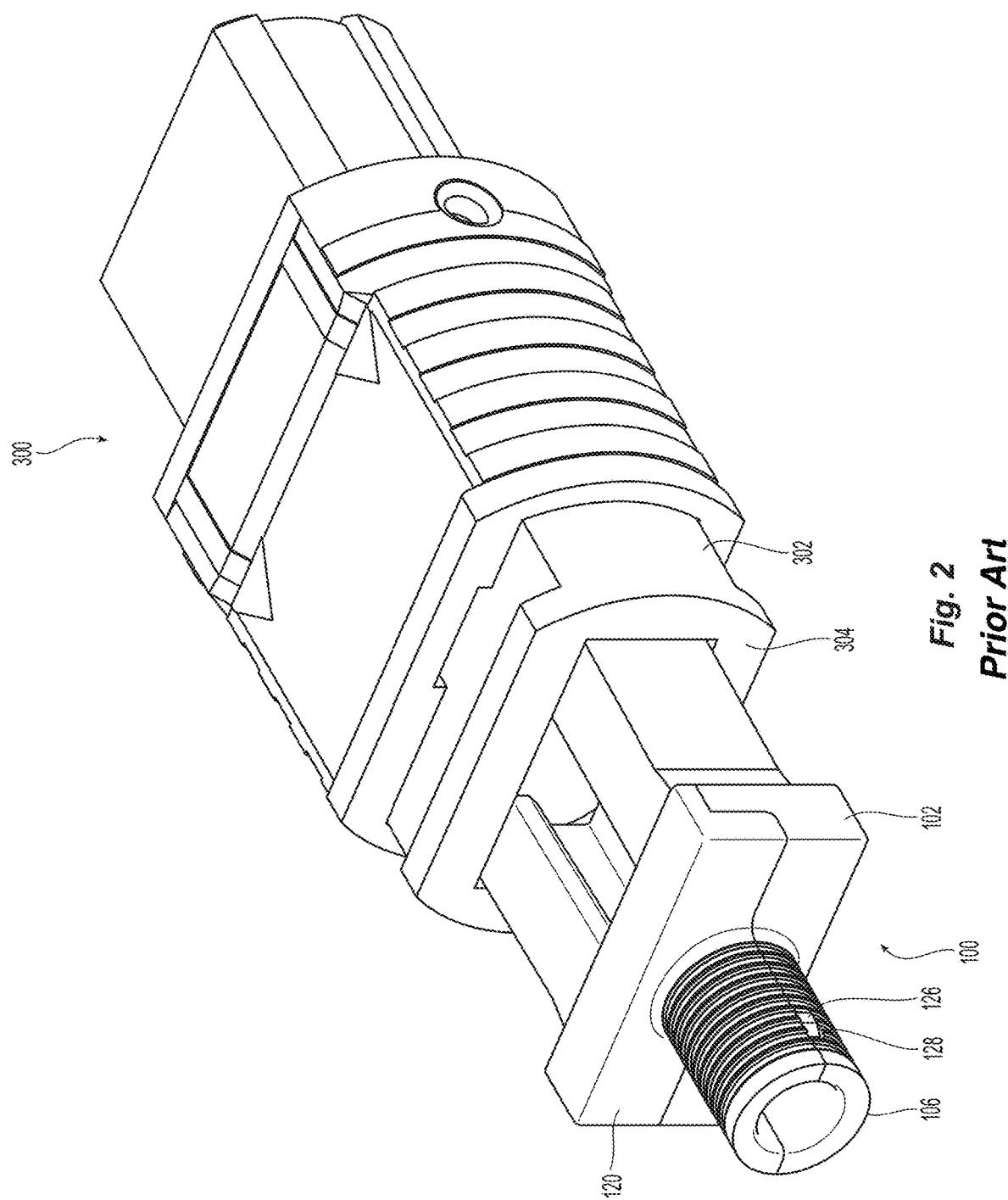
FIG. 2 is perspective view of the prior art two-piece spring push in FIG. 1A assembled and being installed in a fiber optic connector.
Figure 3A:
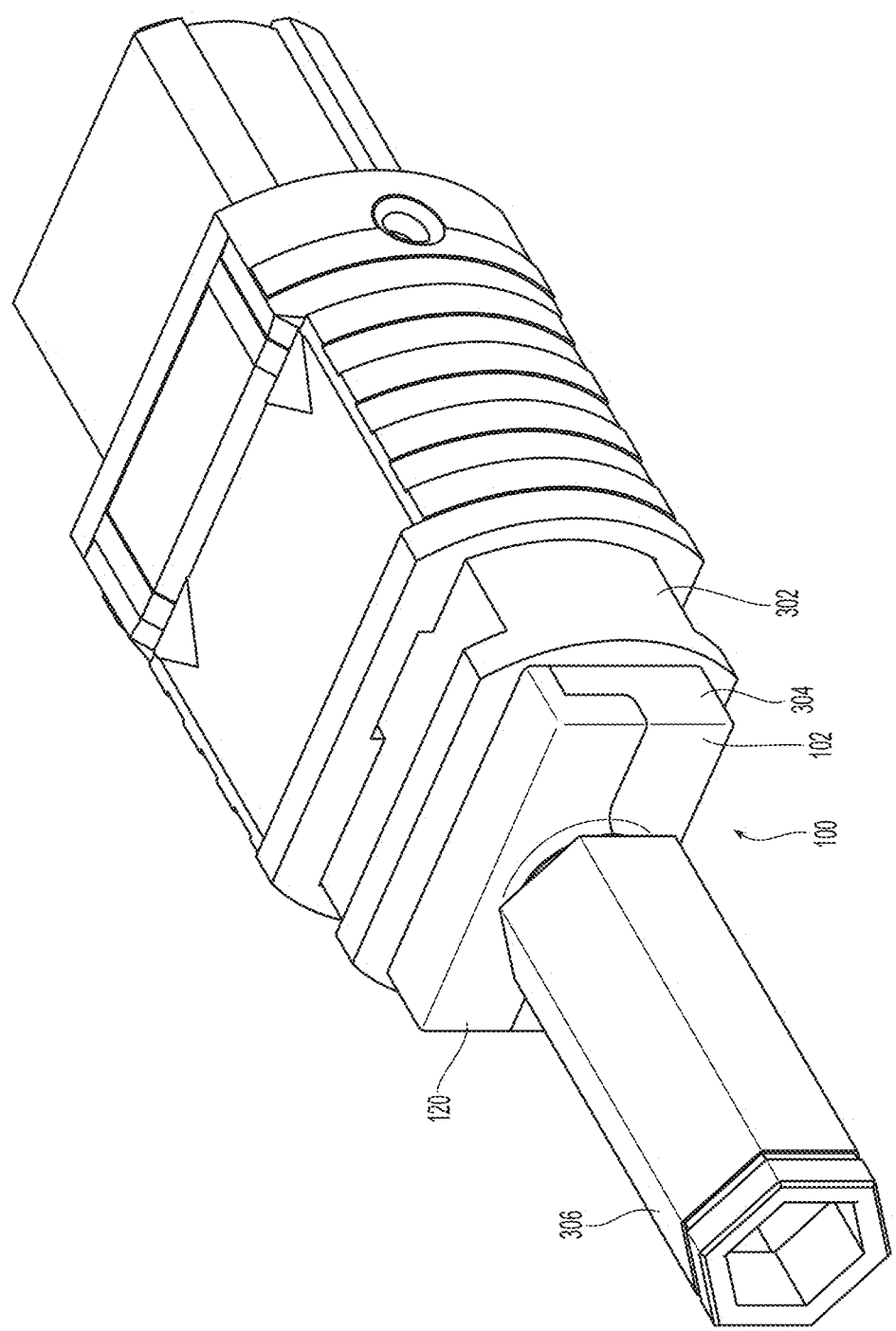
FIG. 3A is a right rear perspective view the prior art two-piece spring push in FIG. 1A inserted into a fiber optic connector.

Illustrated in FIGS. 1A and 1B is a prior art spring push. It is similar to the one that is the subject of U.S. Pat. No. 8,684,611 assigned to the same Assignee as the present application, and the contents thereof are incorporated by reference herein. The spring push 100 has a main body 102 with a front end 104, a back end 106, and a middle portion 108. The front end 104 has two parallel extensions 110 extending from the middle portion 108. The two parallel extensions 110 define an opening 112 therebetween. The back end 106 forms at least a portion of a cylinder. The spring push 100 also has a cap 120 that is configured to mate with the main body 102, the cap 120 has two projections 122 that engage two receptacles 124 in the middle portion 108 of the main body 102. The cap 120 also has two projections 126 that engage two openings 128 in the back end 106 of the main body 102. The main body 102 has a shoulder 130 and, together with a forward facing surface 132 on the cap 120, forms a surface that surrounds the spring push 100 and prevents the spring push 100 from entering into a fiber optic connector 300 and the connector housing 302 in particular. As illustrated in FIG. 2, the spring push 100 is being inserted into the connector housing 302 and will be inserted until the shoulder 130 and the forward facing surface 132 engage a rear facing surface 304 of the connector housing 302 as shown in FIG. 3A. It should be noted that the cap 120 does not enter into the connector housing 302, and is thus outside the connector housing 302.

Figure 3B:
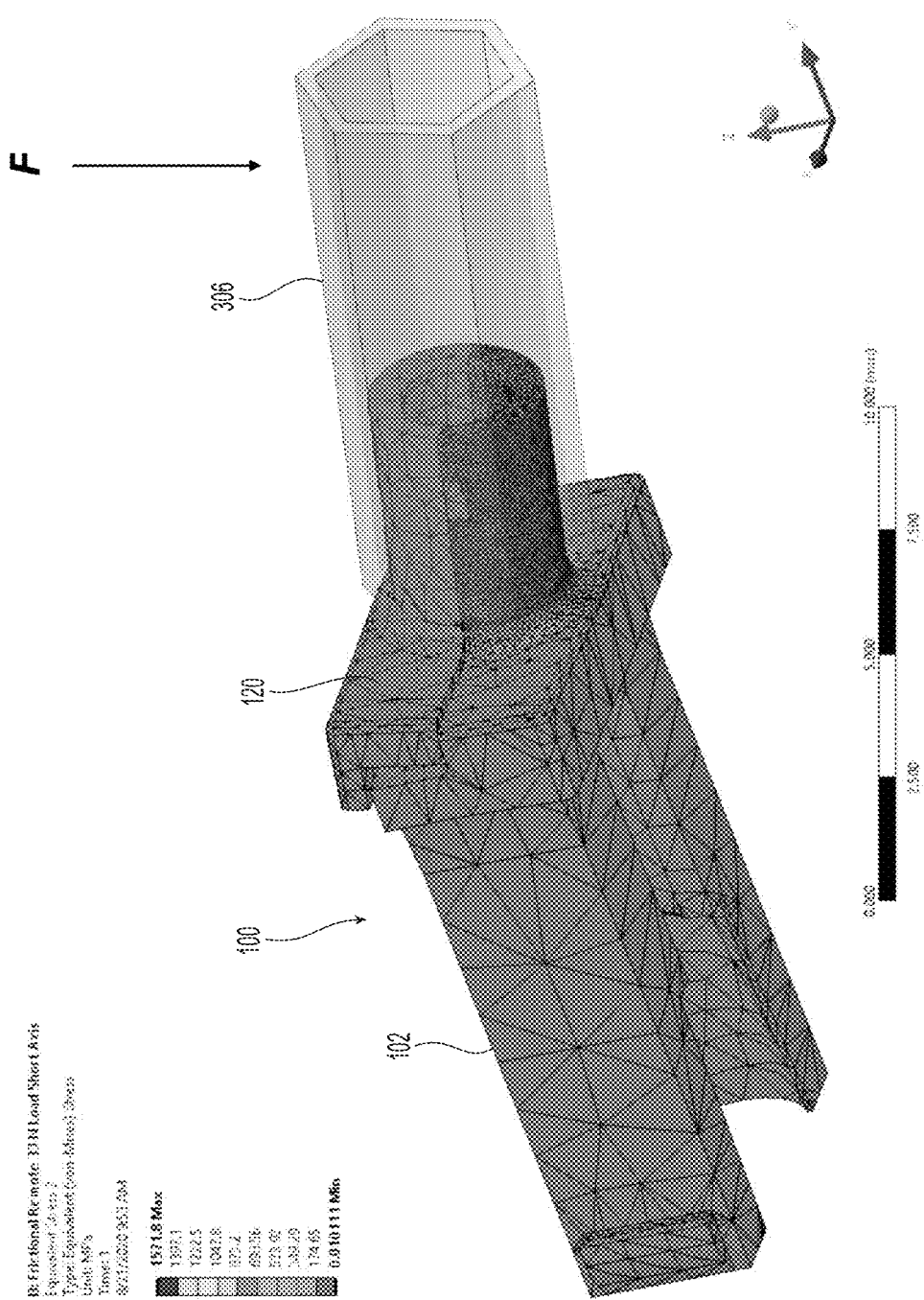
FIG. 3B illustrates the stresses applied to the prior art two-piece spring push during testing.

FIG. 3B illustrates the prior art spring push 100 with a crimp band 306 that engages both the main body 102 and the cap 120. If a sufficient force is applied to the crimp band 306 or the back end of the spring push 100 (in this example, from the top), the spring push 100 may deform and the cap 120 can separate from the main body 102 amounting to a failure of the spring push 100. In FIG. 3B, the cap 120 can be seen detaching from the main body 102 under vertical forces F.

Figure 4:
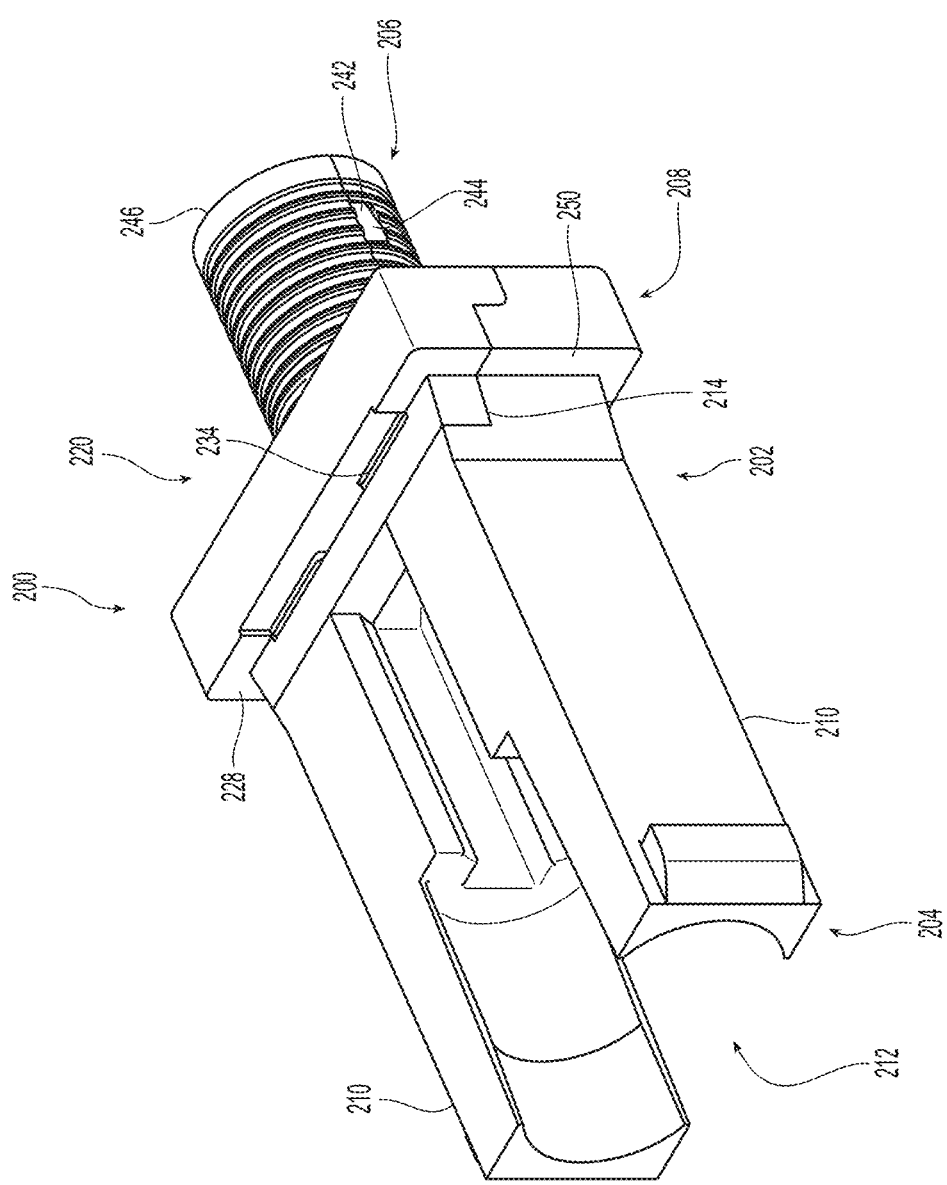
FIG. 4 is a left front perspective view of one embodiment of a two-piece spring push according to the present invention.
Figure 5:
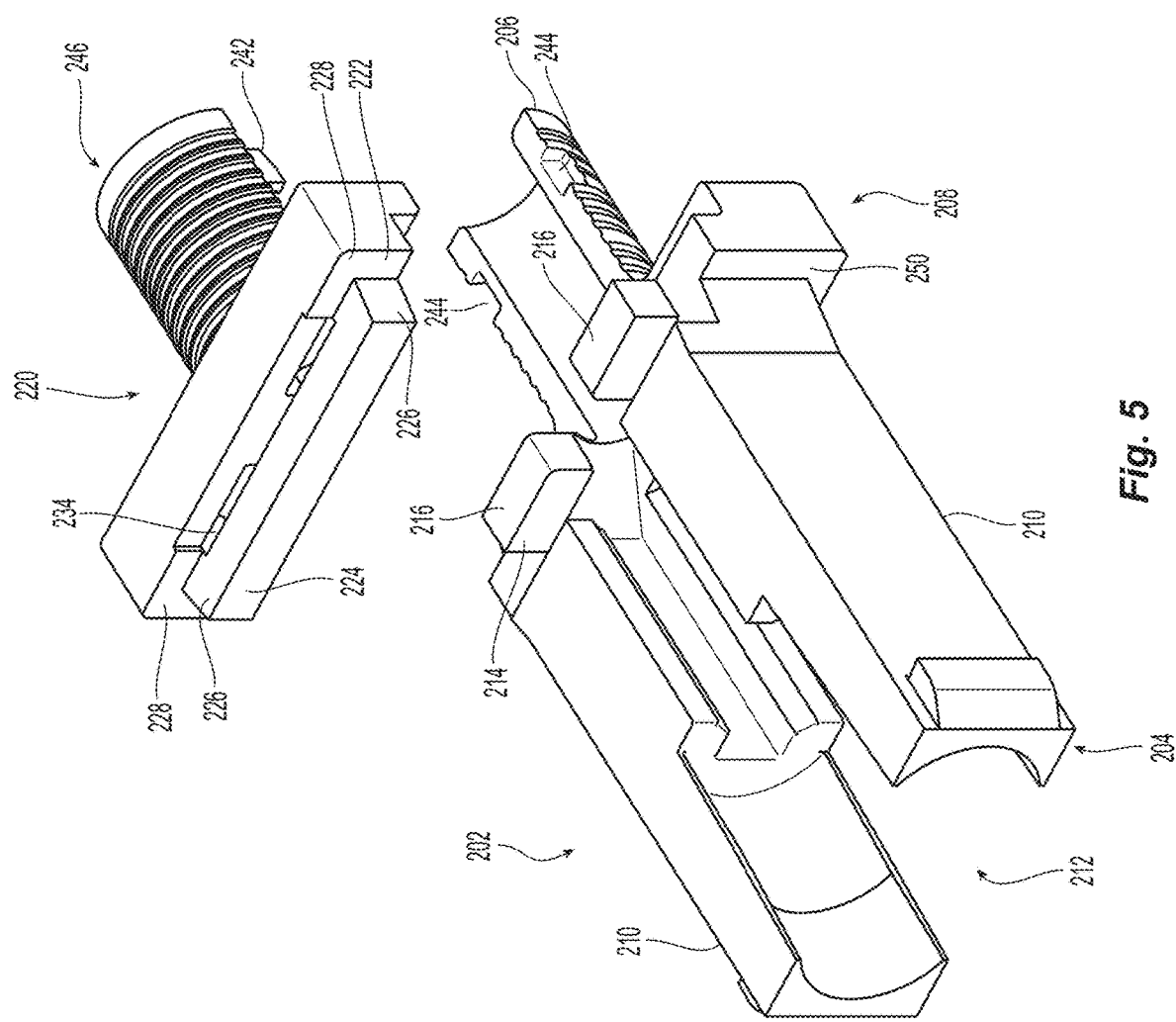
FIG. 5 is an exploded view of the two-piece spring push in FIG. 4.

Applicant notes that the term "front" or "forward" means that direction where the fiber optic ferrule or the optical connector would meet with another fiber optic ferrule or device (such as another connector having another spring push), while the term "rear" or "rearward" is used to mean the direction from which the optical fibers enter into the fiber-optic ferrule or fiber optic connector. In the present application, the spring push 100 will therefore have a front and a rear, the front will be inserted into the connector housing 302 first. Thus, in FIG. 2, the "front" of the spring push 100 is on the right side the figure and pointing into the figure. The "rear" or "back" is that part of the spring push 100 is on the left side of the page and "rearward" and "backward" is toward the left and out of the page. The same is true of spring push 200 with respect to FIGS. 4 and 5.

Turning now to one embodiment of the claimed spring push 200, the spring push 200 has a main body 202 with a front end 204, a back end 206, and a middle portion 208. The front end 204 has two parallel extensions 210 extending from the middle portion 208. The two parallel extensions 210 define an opening 212 therebetween. The back end 206 forms at least a portion of a cylinder that is in communication through the middle portion 208 with the opening 212. The main body 202 includes a slot 214 that extends across the main body 202, and is located between the middle portion 208 and the front end 204—and between the two parallel extensions 210 in particular. Extending upward from the main body 202 and adjacent the slot 214 within the middle portion 208 are two alignment features 216, the features and functions of which are discussed below. Preferably, the alignment features 216 are two posts. The posts 216 have a space 218 between them to allow for optical fibers (not shown) to be inserted from the top of the main body 202, through the space 218 and into the opening 212 and the portion of the cylinder at the back end 206. The posts 216 are illustrated as rectangular projections but could take other shapes as desired.

Figure 6:
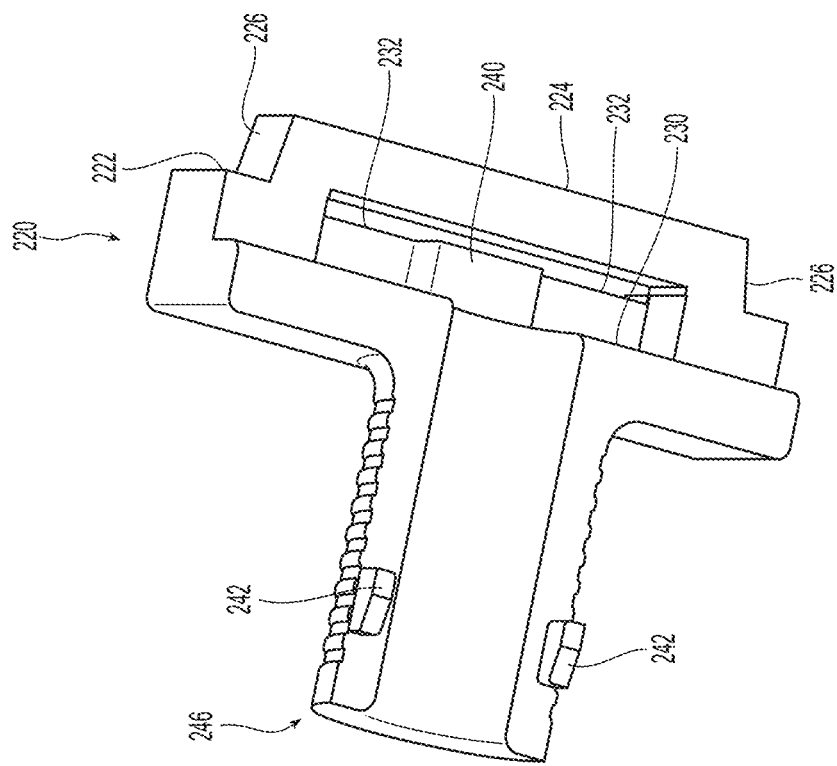
FIG. 6 is perspective view from the bottom of the cap of the two-piece spring push in FIG. 4.
Figure 7:
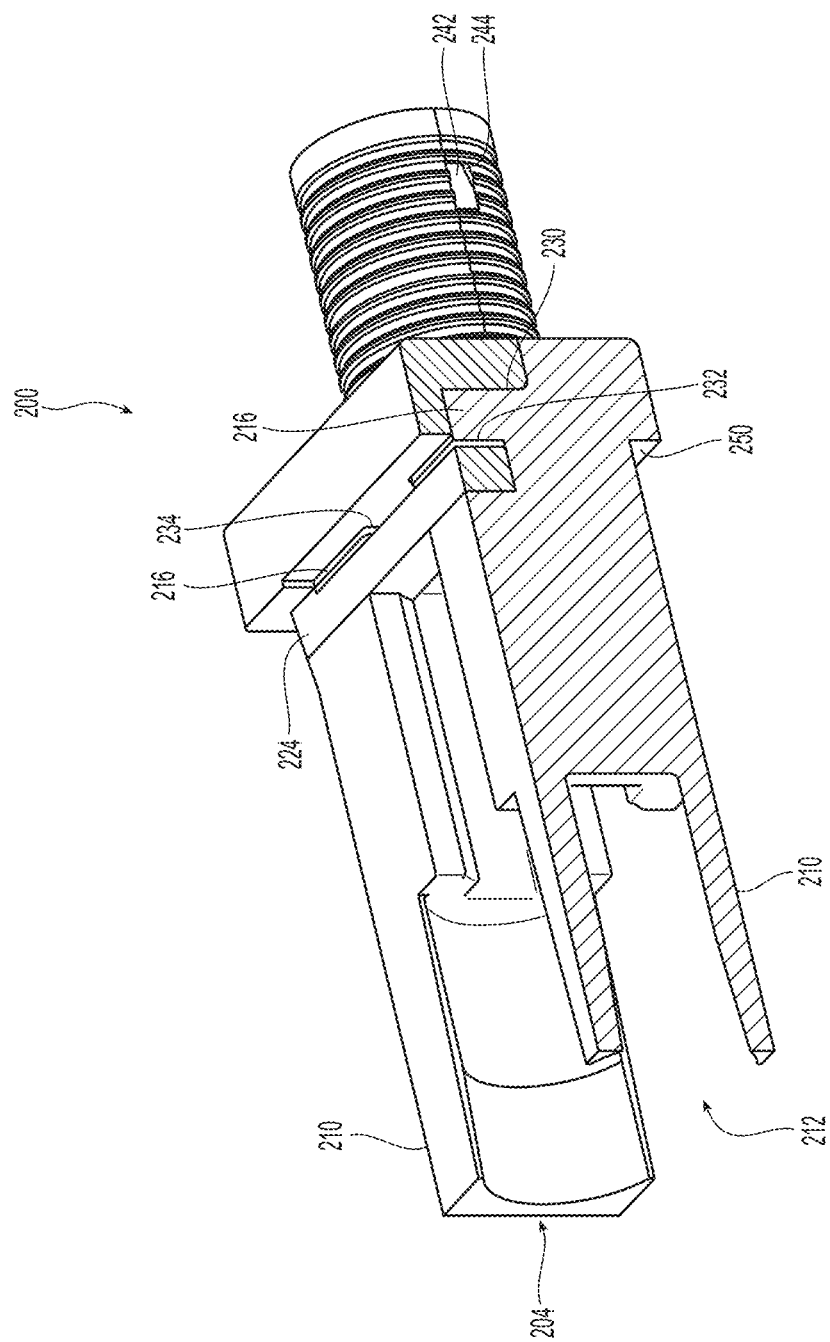
FIG. 7 is a cross sectional view of the two-piece spring push in FIG. 4.

The spring push 200 also has a cap 220 that is configured to mate with the main body 202. The cap 220 is shown as a separate piece from the main body 202. However, in some alternative aspects of this disclosure, the cap 220 may be rotatably attached to the main body permanently, for example, at the portion of the cylinder. In that case, the cap 220 can move between mated and unmated conditions with the main body 202 by rotating between the two positions. Yet alternatively, instead of rotation, a translational or sliding motion may open or close the part of the opening 212 that is formed within the portion of the cylinder at the back end 206. The cap 220 has a front face 222 and locking member 224 that extends forward of the front face 222—and preferably beyond all other portions of the cap 220. The locking member 224 extends away from the front face 222 by way of two extensions 226. The extensions 226 could be located in other positions on the cap 220 and there may also be fewer or more extensions for the locking member 224. It is also noted that the front face 222 has a first forward facing surface 228. There is a second forward facing surface 230 on the cap 220—see FIGS. 6 and 7. There is a gap 232 that is formed between the locking member 224 and the rest of the cap 220. The gap 232 is a result of space between the locking member 224 and the second forward facing surface 230. However, there may also be another smaller space or gap 234 between the locking member 224 and the cap 220 at the top of the locking member 224. See FIGS. 4, 6, 7, and 13.

While the locking member 224 is illustrated as extending from one side of the cap 220 to the other, the locking member 224 does not need to extend all the way across the cap 220. See, e.g., FIG. 15 and the discussion below. There could, for example, be a portion of the locking member 224 on each of the extensions 226 and they could extend toward one another. Alternatively, the locking member may only extend from one side of the cap 220.

When the main body 202 and the cap 220 are mated to one another, there is an enclosed opening 218a through the spring push 200 to allow the optical fibers to pass therethrough. Looking at FIG. 5 in particular, one can see that the optical fibers could pass through the opening 212 and the space 218 and out the cylindrical back end 206. See also FIG. 14. There may also be a bump or extension 240 that extends downward from the cap 220 into the gap 232 to help limit the movement of the optical fibers. There is still sufficient area in the space 218 for the optical fibers to be positioned without crushing, pinching, or otherwise affecting them once inserted into the spring push 100 and the cap installed on the main body 202.

Figure 9:
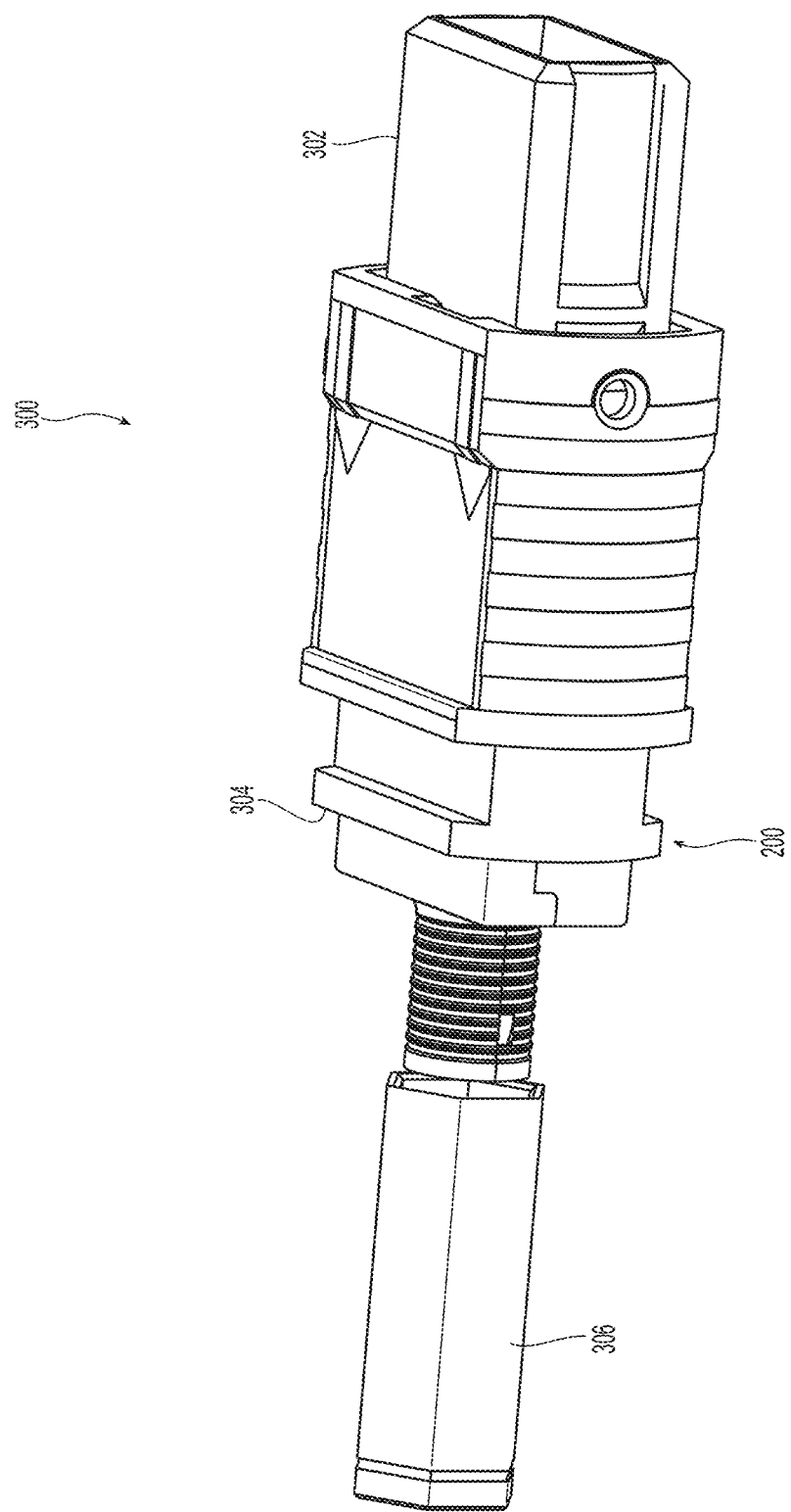
FIG. 9 is a top perspective view of the two-piece spring push in FIG. 4; inserted into a fiber optic connector and having a crimp band about to be placed on the crimp body portion thereof.

The cap 220 has two projections 242 that engage two recesses 244 in the back end 206 of the main body 202. The cooperation of the recesses 244 and the projections 242 keep the back end 206 of the main body 202 with the back end 246 of the cap 220. The two back ends of the main body and the cap 220 combine to form a cylindrical structure that accepts a crimp band, such as the crimp band 248 as illustrated in FIG. 9. The back ends 206, 248 may have a configuration other than cylindrical, such as polygonal, oval, etc.

When the cap 220 is attached to the main body 202, there are three main areas of engagement between and the alignment of the cap 220 and the main body 202. The first area is the locking member 224 being inserted into the slot 214. See FIG. 7. The second area is where the posts 216 are received into the gap 232 and possibly into space or gap 234 that is located between the locking member 224 and the cap 220. The bump or extension 240 extends into the space 218 fixing the location of the cap 220 on the main body 202. Finally, the two projections 242 engage two recesses 244 in the back end 206 of the main body 102.

Figure 8:
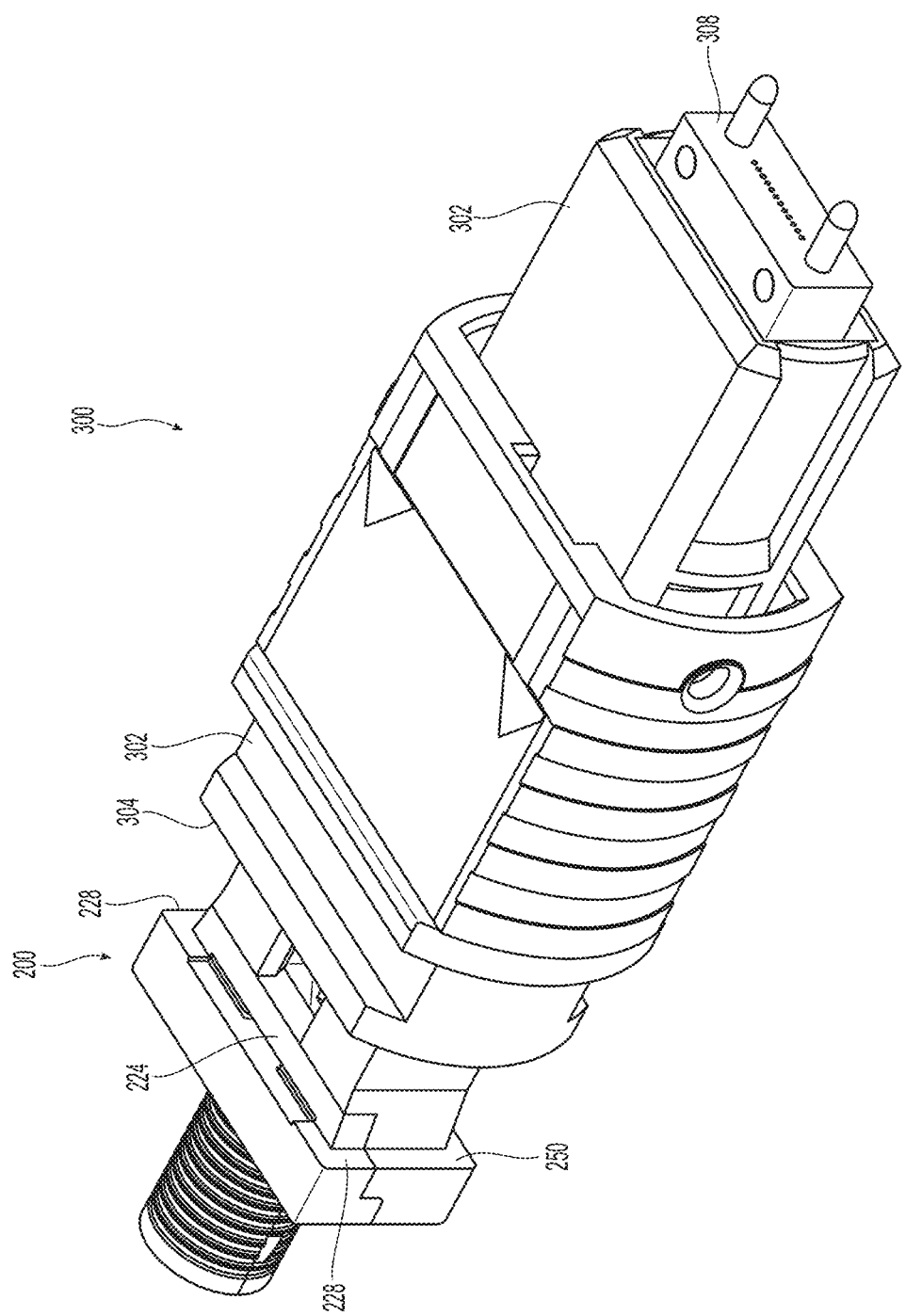
FIG. 8 is a front side perspective view of the two-piece spring push in FIG. 4; inserted into a fiber optic connector housing.

The main body 202 has a shoulder 250 and, together with a forward facing surface 228 on the cap 220, forms a surface that surrounds the spring push 200 that prevents the spring push 200 from being inserted into the connector housing too far. As noted above and in more detail below, some of the strength of the spring push 200 is that a portion of the cap 220 is inserted into the connector housing 302 of a fiber optic connector 300. In FIG. 8, there is illustrated a fiber optic connector 300 that has a connector housing 302 and a fiber optic ferrule or fiber support structure 308. There may also be other components within the fiber optic connector 300 that are not visible. For example, there may be a pin-keeper; springs, etc. The fiber optic ferrule 308 is illustrated as an MTP® brand connector fiber optic ferrule, but it could take other forms that cooperate with the spring push 200. The fiber optic ferrule 308 supports the optical fibers that are passed through the spring push 200.

Figure 10:
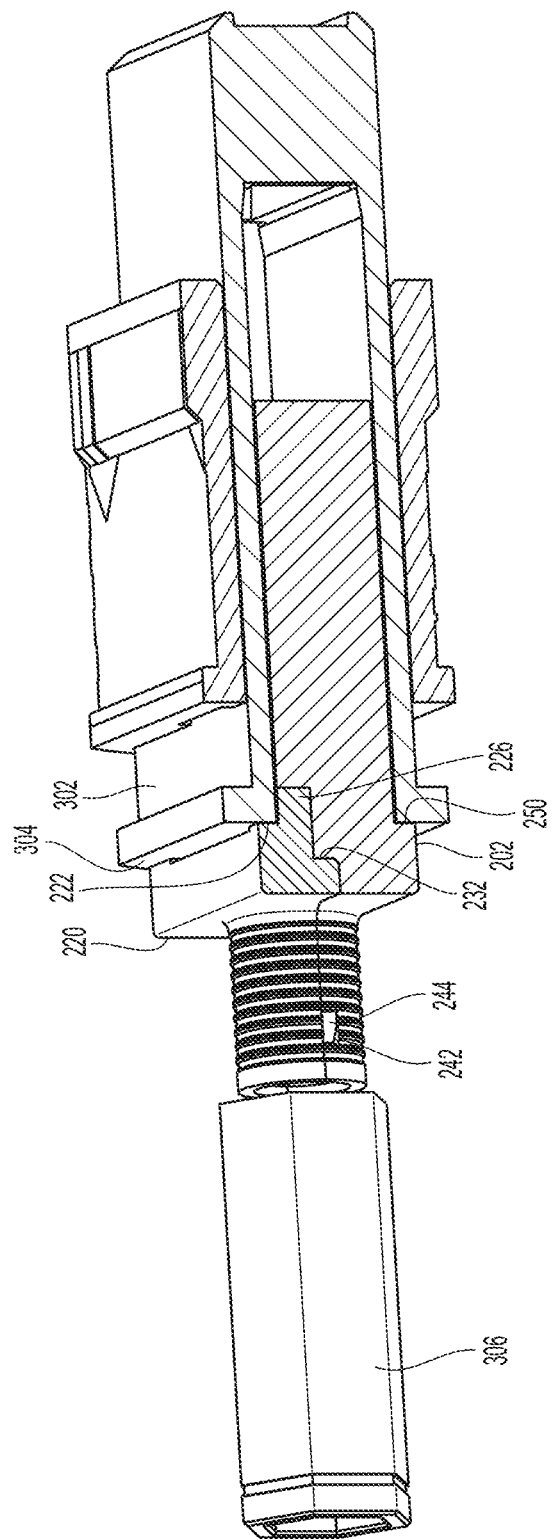
FIG. 10 is a cross section view of the two-piece spring push inserted into a fiber optic connector housing in FIG. 8.
Figure 11:
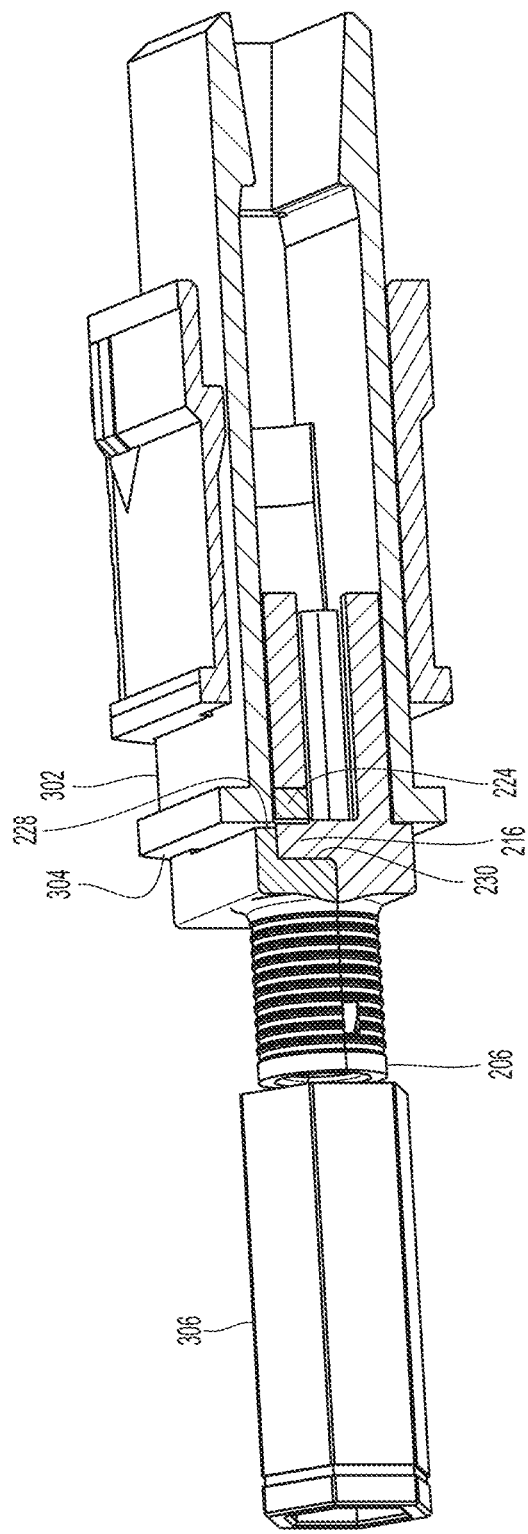
FIG. 11 is a cross section view of the two-piece spring push inserted into a fiber optic connector housing in FIG. 8 closer to the center thereof.
Figure 12:
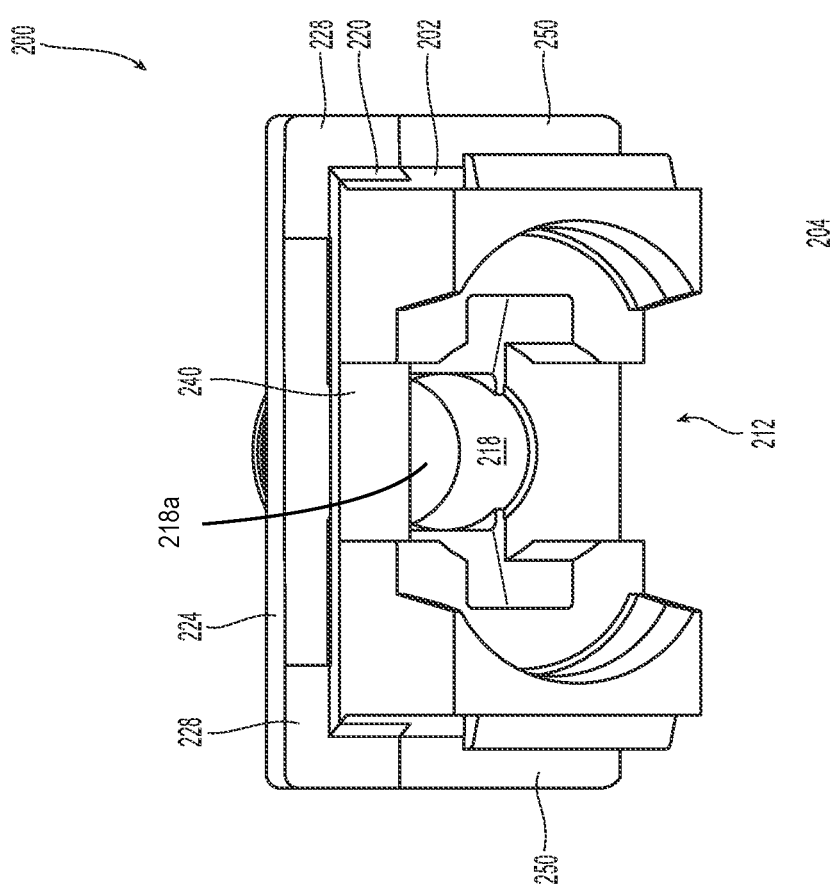
FIG. 12 is a perspective view from the top of the two-piece spring push in FIG. 4.
Figure 13:
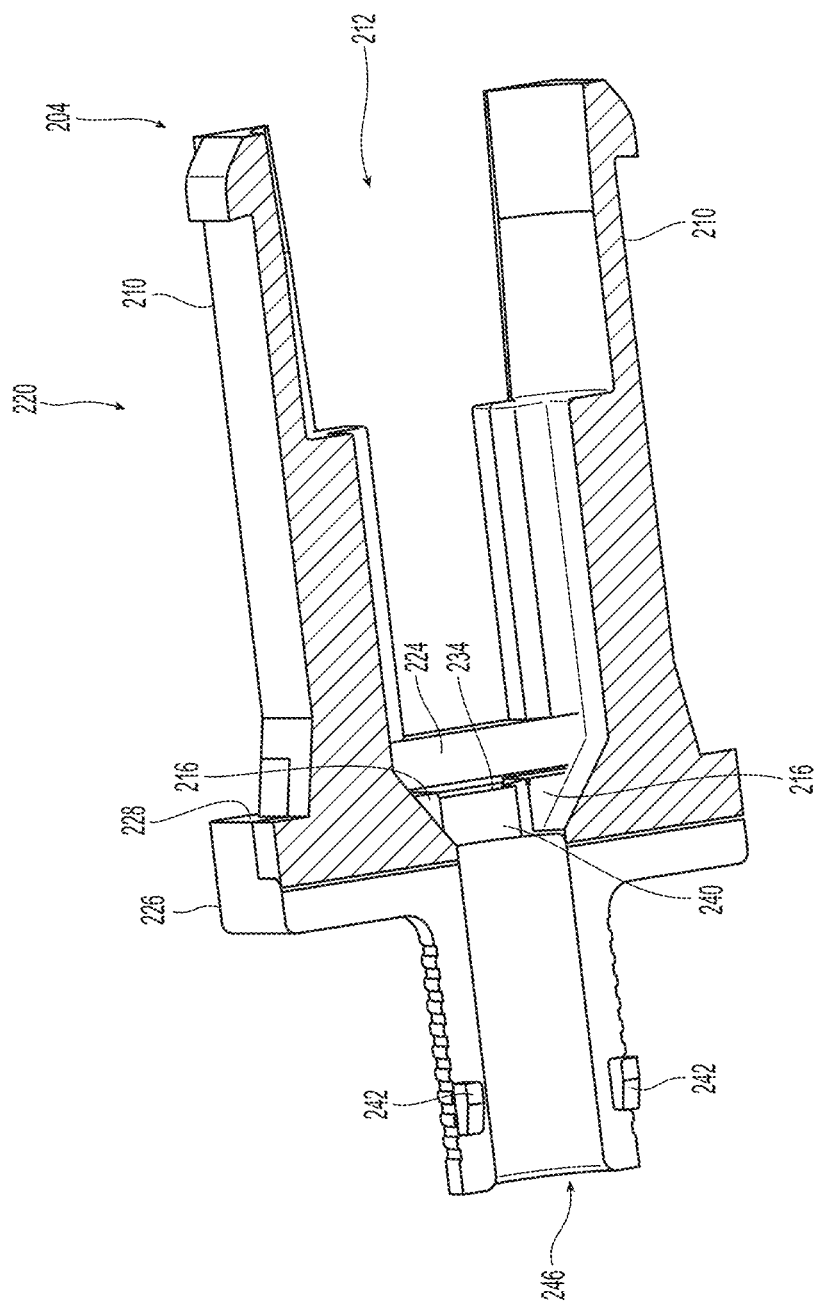
FIG. 13 is perspective view of a cross section of the two-piece spring push from the bottom.
Figure 14:
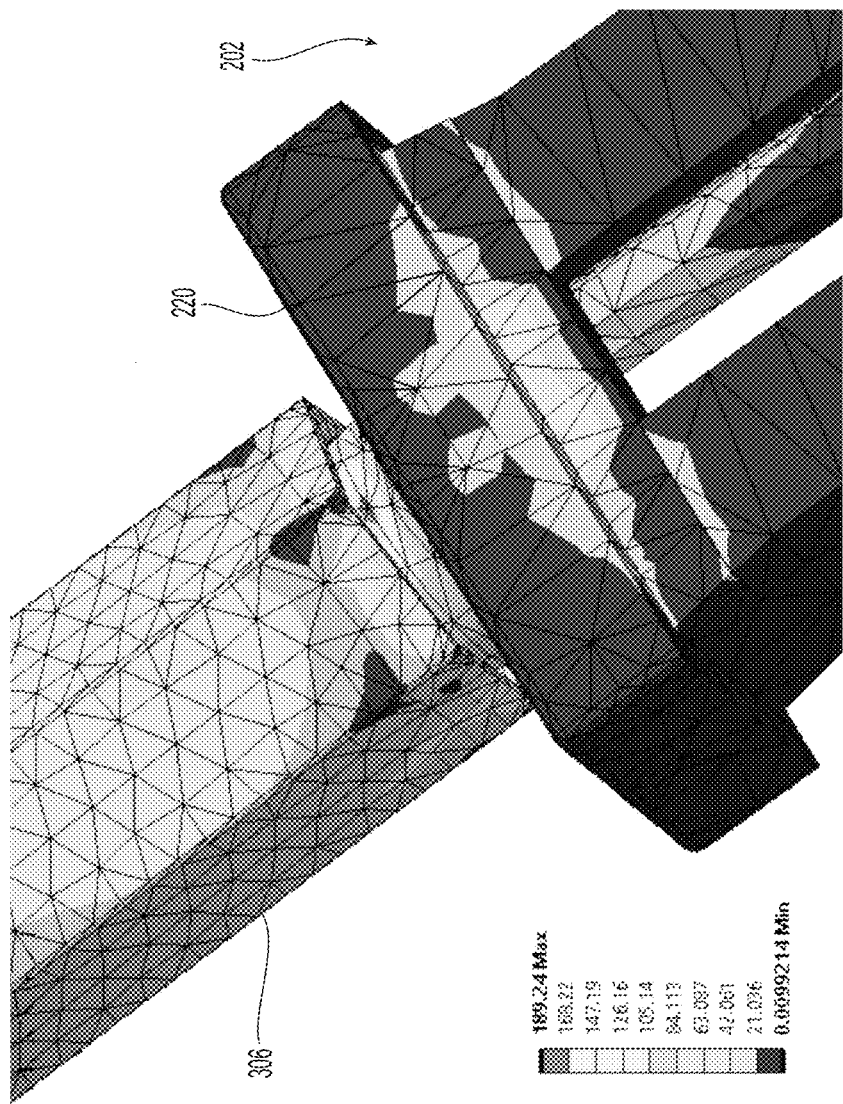
FIG. 14 is an illustration showing the stresses applied to the two-piece spring push and the crimp body in FIG. 4.

FIGS. 8-11 illustrate the spring push 200 with respect to the fiber optic connector 300. In FIG. 8, the spring push 200 is being inserted into the connector housing 302. In FIG. 9, the spring push 200 has been inserted into the back end of the connector housing 302, such that the shoulder 250 of the spring push 200 is engaging the rear facing surface 304 of the connector housing 302. The fiber optic ferrule 308 has been removed from the figure. FIG. 10 is a cross-section of the fiber optic connector 300 in FIG. 9. In this figure, the locking member 224 (and a portion of one of the extensions 226) within the connector housing 302. The first forward facing surface 228 and the shoulder 250 are engaging the rear facing surface 304. FIG. 11 is of the same configuration, but the section is closer to the center of the spring push 220 and shows the posts 216 having been received within the gap 232. The locking member 224 is also shown within the connector housing 302. The locking member 224 engages the inside surface of the connector housing 302, thereby the main body 202 and the cap 220 are trapped together inside the connector housing unlike in the prior art. When a force is applied to the back end of the spring push 200, the load is transferred to the alignment posts 216 by the locking member 224 rather than creating a bending moment on the crimp body 206. This is illustrated in FIG. 14 by the presence of stress in the locking member 224 as it is stretched against the alignment posts 206—This prevents the main body 202 and the cap 220 from separating like in the prior art (see, FIG. 3B). At least a portion of the stress that is applied to the spring push 200 is transferred to the connector housing 302.

As noted above, the locking member need not traverse the width of the cap 220 in a transverse direction. It will be appreciated by one of ordinary skill in view of this disclosure that the first forward facing surface 228 and the second forward facing surface 230 may be merged such that only the second forward facing surface 230 exists, from which the locking member 224 extends forwardly.

As illustrated in FIG. 15, there is an alternative embodiment of a cap 220'. The cap 220' has a front face 222' and two portions of a locking member 224' that extend forward of the front face 222'—and preferably beyond all other portions of the cap 220' in a forward direction. The locking member 224' extends away from the front face 222' by way of two extensions 226'. The extensions 226' could be located in other positions on the cap 220' and there may also be fewer or more extensions for the locking member 224'. There is a second forward facing surface 230' on the cap 220'. The second forward facing surface 230' is located where the portion of the cylinder ends in a forward direction, behind a bump 240'. There is a gap 232' that is formed between the locking member 224' and the cap 220'. The bump or extension 240' that extends downward from the cap 220' into the gap 232' to help limit the movement of the optical fibers. The cap 220' has two projections 242' that engage two recesses 244 in the back end 206 of the main body 202. It will be appreciated by one of ordinary skill in view of this disclosure that the front face 222' and the second forward facing surface 230' may be merged such that only the second forward facing surface 230' exists, from which the locking member 224' extends forwardly.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A two-piece spring push for use with a fiber optic connector comprising:
  a main body, the main body having a front end, a back end, and a middle portion disposed therebetween, the front end comprising two generally parallel extensions extending from the middle portion and having an opening therebetween, the back end forming at least a portion of a cylinder; and
  a cap configured to mate with the main body, the cap having a front face and a locking member, the locking member disposed forward of the front face and forming a gap between the locking member and the front face, the locking member engaging at least a portion of the middle portion of the main body, the cap and the main body forming an enclosed opening through at least a portion of the spring push to allow optical fibers of the fiber optic connector to pass therethrough.

2. The two-piece spring push according to claim 1, wherein the locking member is attached to a forward facing surface of the front face, the main body having at least two alignment features to align the cap with the main body.

3. The two-piece spring push according to claim 2, wherein the forward facing surface of the front face is a first forward facing surface and the cap has a second forward facing surface defining at least a portion of the gap.

4. The two-piece spring push according to claim 2, wherein the locking member only extends across a portion of the front face of the cap.

5. The two-piece spring push according to claim 3, wherein the at least two alignment features comprise two posts, the two posts being disposed in the gap between the second forward facing surface and the locking member when the cap and the main body are mated to one another.

6. The two-piece spring push according to claim 5, wherein a portion of the locking member is disposed within a slot in the main body, the slot disposed between the two posts and the two generally parallel extensions.

7. The two-piece spring push according to claim 1, wherein the back end of the main body has two receivers to receive two projections on the cap to hold the cap when the cap and the main body are mated to one another.

8. The two-piece spring push according to claim 1, further comprising a bump extending from the cap into a portion of the enclosed opening to limit movement of optical fibers therein.

9. The two-piece spring push according to claim 1, wherein at least a portion of the locking member is disposed within an opening in a housing of a fiber optic connector when the fiber optic connector is fully assembled.

10. The two-piece spring push according to claim 9, wherein the front face of the cap engages a portion of the housing of the fiber optic connector when the fiber optic connector is fully assembled.

11. The two-piece spring push according to claim 1, wherein the front face of the cap and a portion of the main body form a shoulder on the two-piece spring push, the shoulder engaging a housing of a fiber optic connector when the fiber optic connector is fully assembled.

12. A spring push for use with a fiber optic connector comprising:
  a main body, the main body having a front end, a back end, and a middle portion disposed therebetween, the front end comprising two generally parallel extensions extending from the middle portion and having an opening therebetween, the back end forming at least a portion of a cylinder; and
  a cap configured to mate with the main body, the cap having a front face and a locking member, the locking member disposed forward of the front face and forward of the middle portion of the main body, the locking member engaging at least a portion of the middle portion of the main body,
  wherein the cap and the main body form an enclosed opening through at least a portion of the spring push to allow optical fibers of the fiber optic connector to pass therethrough.

13. The spring push according to claim 12, wherein the locking member is a forward-most component of the cap.

14. The spring push according to claim 12, wherein the locking member is located inside an opening of the fiber optic connector when fully assembled with the spring push.

15. The spring push according to claim 12, wherein the locking member is joined to the front face at two locations of the front face of the cap forming a gap between the locking member and the front face of the cap.

16. The spring push according to claim 12, wherein the locking member comprises two separate extensions from the front face on opposite sides of the enclosed opening in the main body.

17. The spring push according to claim 16, wherein the locking member further comprises a bridge portion joining the two separate extensions and forming a gap between the cap and the locking member.

* * * * *